Oct. 22, 1935.  C. T. PFLUEGER  2,018,468

FISHING REEL

Filed April 26, 1934

INVENTOR
CHARLES T. PFLUEGER

BY Ely & Barrow

ATTORNEYS

Patented Oct. 22, 1935

2,018,468

UNITED STATES PATENT OFFICE 2,018,468

FISHING REEL

Charles T. Pflueger, Akron, Ohio, assignor to The Enterprise Manufacturing Company, Akron, Ohio, a corporation of Ohio Application April 26, 1934, Serial No. 722,450

7 Claims. (Cl. 242—84.1)

The present invention relates to the construction of reels and particularly to reels used in fly-casting, or for other purposes. The purpose of the invention is to facilitate fly-casting, making it possible for the fisherman to cast more easily and with less tiring effects.

In the ordinary equipment such as supplied for this purpose the weight of the reel is fixed so that it is not possible to alter the weight to balance the rod. A balanced rod makes the operation of fly-casting much easier, and it is desirable that this be done, but prior to the present invention no reel has been offered to the customer by which any rod can be accurately balanced. It is therefore the object and purpose of the invention to design a reel, particularly a fly-casting or trout reel by which any equipment can be evenly balanced.

This purpose is attained by the construction shown and described herein, it being understood that changes and modifications may be made within the scope of the invention and that the invention is not limited to the specific form shown herein.

Figure 1:
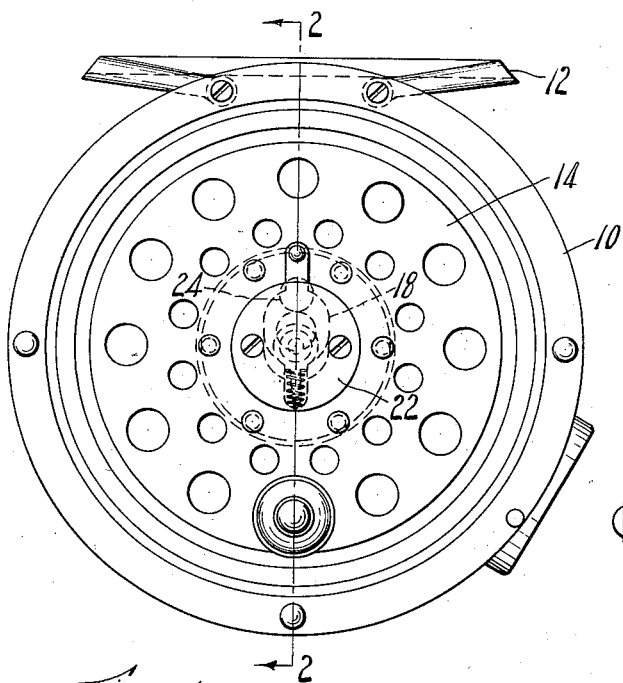
Figure 1 is a side elevation of a typical trout reel embodying the invention.

The reel shown herein is merely typical of various forms of reels for the general purpose. It comprises a reel cage or housing indicated at 10, which is mounted upon a rod by means of a cross plate 12. The spool is shown at 14, being mounted upon a stationary bearing post 16 rising from the reel cage. The spool is retained upon the post by a sliding latch or catch 18, spring-pressed into locking position to engage a groove 20 in the outer end of the post. This catch is carried in a removable plate 22 attached to the face of the spool.

Figure 2:
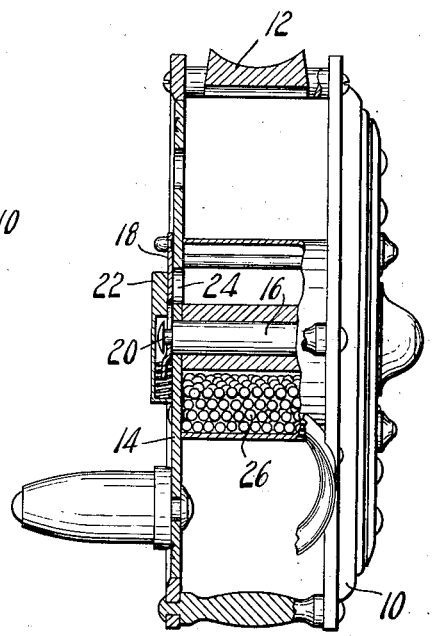
Figure 2 is a section on the line 2—2 of Figure 1.
Figure 3:
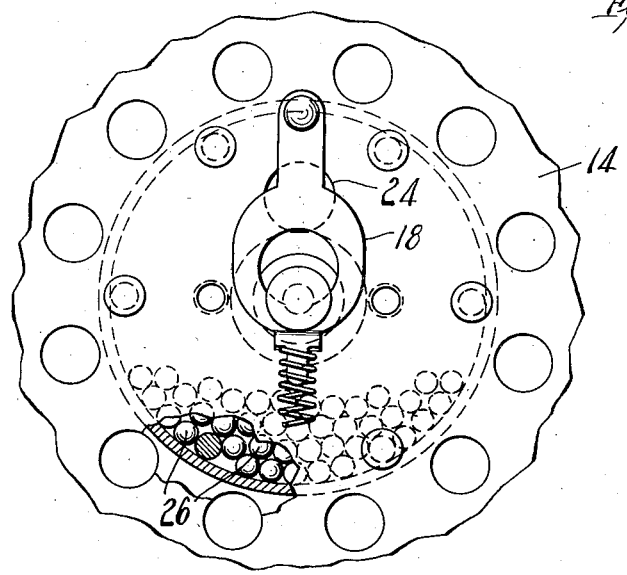
Figure 3 is an enlarged side view of a portion of the reel at the hub.

The interior of the spool is hollow as shown in Figure 2 and the face of the spool is formed with an opening 24 which is beneath the plate 22 so that when the plate is removed the chamber in the interior of the spool is accessible. In order to increase the weight of the reel which is normally lighter than the outwardly extending portion of the rod, the fisherman may insert some ballast through the opening in the spool. Preferably shot are used for this purpose as shown at 26. By increasing or diminishing the amount of ballast or shot the reel may be brought to a weight comparable with the overbalanced weight of the rod. A packing of cotton or a wick may be inserted above the shot to prevent rattling.

By the means shown a simple and easy means of increasing the weight of the reel is secured, and the fisherman is enabled to balance his rod.

What is claimed is:

1. A reel, particularly for use in casting, comprising a reel casing and a spool, the interior of the spool being hollow and having a passage to the exterior of the spool, means to close the passage, and ballast located within the hollow interior of the spool.

2. A reel, particularly for use in casting, comprising a reel casing and a spool, the interior of the spool being hollow and having a passage to the exterior of the spool, means to close the passage, and a variable ballast located within the hollow interior of the spool.

3. A reel, particularly for use in casting, the balancing weight of which is less than the balancing weight of that portion of the rod extending outwardly therefrom, ballast of discretionary weight, and means on the reel for retaining said ballast whereby the weight of the reel may be increased by varying amounts to counteract the overbalance of the rod.

4. A reel, particularly for use in casting, the balancing weight of which is less than the balancing weight of that portion of the rod extending outwardly therefrom, a chamber associated with the reel, accessible from the exterior thereof, and ballast in said chamber to counterbalance the rod.

5. A reel, particularly for use in casting, the balancing weight of which is less than the balancing weight of that portion of the rod extending outwardly therefrom, a chamber associated with the reel, accessible from the exterior thereof, and a fluent ballast in said chamber to counterbalance the rod.

6. A fishing reel comprising a chamber within its structure accessible from the exterior thereof, and ballast consisting of an arbitrary quantity of pellets in said chamber.

7. A fishing reel comprising a chamber within its structure accessible from the exterior thereof, a fluent, non-liquid ballast occupying a portion of said chamber, and a packing occupying the remainder of said chamber to prevent displacement of said ballast.

CHARLES T. PFLUEGER.